(12) United States Patent
Rajapakse

(10) Patent No.: US 9,847,904 B2
(45) Date of Patent: Dec. 19, 2017

(54) SEMI-AUTOMATED CONFIGURATION OF A LOW-LATENCY MULTIMEDIA PLAYBACK SYSTEM

(71) Applicant: Blackfire Research Corporation, San Francisco, CA (US)

(72) Inventor: Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

(21) Appl. No.: 15/379,441

(22) Filed: Dec. 14, 2016

(65) Prior Publication Data

US 2017/0317877 A1 Nov. 2, 2017

Related U.S. Application Data

(63) Continuation-in-part of application No. 15/178,544, filed on Jun. 9, 2016, which is a continuation-in-part of application No. 15/284,518, filed on Oct. 3, 2016, and a continuation-in-part of application No. 15/336,745, filed on Oct. 27, 2016, now Pat. No. 9,699,684.

(60) Provisional application No. 62/367,930, filed on Jul. 28, 2016, provisional application No. 62/328,562, filed on Apr. 27, 2016.

(51) Int. Cl.
| | |
|---|---|
| *H04N 21/00* | (2011.01) |
| *H04L 12/24* | (2006.01) |
| *H04N 21/472* | (2011.01) |
| *H04N 21/439* | (2011.01) |
| *H04L 29/06* | (2006.01) |
| *H04W 88/08* | (2009.01) |
| *H04W 84/12* | (2009.01) |
| *H04N 21/436* | (2011.01) |
| *H04N 21/41* | (2011.01) |

(52) U.S. Cl.
CPC .............. *H04L 41/08* (2013.01); *H04L 65/60* (2013.01); *H04N 21/439* (2013.01); *H04N 21/47217* (2013.01); *H04N 21/4126* (2013.01); *H04N 21/43615* (2013.01); *H04W 84/12* (2013.01); *H04W 88/08* (2013.01)

(58) Field of Classification Search
CPC ..................... H04N 21/4126; H04N 21/43615
See application file for complete search history.

(56) References Cited

U.S. PATENT DOCUMENTS

| | | | |
|---|---|---|---|
| 2010/0211874 A1 | 8/2010 | Weiss | |
| 2010/0250761 A1 | 9/2010 | Hird et al. | |
| 2012/0078720 A1* | 3/2012 | Pappas | G06F 8/38 705/14.55 |
| 2015/0200985 A1 | 7/2015 | Feldman et al. | |
| 2016/0055732 A1* | 2/2016 | Howard | G08B 21/0272 340/539.13 |

(Continued)

*Primary Examiner* — Zachary K Huson
(74) *Attorney, Agent, or Firm* — Galvin Patent Law LLC; Brain R. Galvin

(57) ABSTRACT

A system and method for semi-automated configuration of a low-latency multimedia playback system, wherein a media computing device is configured to present a plurality of configuration prompts for user interaction via a wireless network, direct the configuration of the media computing device based on received user interaction via the prompts, and direct the operation of a plurality of network-connected media rendering devices.

6 Claims, 12 Drawing Sheets

(56) References Cited

U.S. PATENT DOCUMENTS

2016/0080549 A1* 3/2016 Yuan ................ H04M 1/72533
455/420

* cited by examiner

SEMI-AUTOMATED CONFIGURATION OF A LOW-LATENCY MULTIMEDIA PLAYBACK SYSTEM

CROSS-REFERENCE TO RELATED APPLICATIONS

This application is a continuation-in-part of U.S. patent application Ser. No. 15/336,745, titled "LOW-LATENCY MULTIMEDIA USING DUAL WIRELESS ADAPTERS", filed on Oct. 27, 2016, which claims priority to U.S. provisional patent application Ser. No. 62/367,930, titled "LOW-LATENCY MULTIMEDIA USING DUAL WIRELESS ADAPTERS" filed on Jul. 28, 2016, the entire specification of each of which is incorporated herein by reference in its entirety. This application is also a continuation-in-part of U.S. application Ser. No. 15/284,518, titled "MULTICHANNEL AUDIO INTERCEPTION AND REDIRECTION FOR MULTIMEDIA DEVICES", filed on Oct. 3, 2016, and is also a continuation-in-part of U.S. application Ser. No. 15/178,544, titled "MEDIA COMPUTING DEVICE WITH MULTIPLE VIRTUAL SCREENS AND PERSONAL AREA NETWORK CAPABILITY", filed on Jun. 9, 2016, which claims priority to U.S. provisional patent application Ser. No. 62/328,562, titled "MEDIA COMPUTING DEVICE WITH MULTIPLE VIRTUAL SCREENS" filed on Apr. 27, 2016, the entire specification of each of which is incorporated herein by reference in its entirety.

BACKGROUND OF THE INVENTION

Field of the Art

The disclosure relates to the field of multimedia computing devices, and more particularly to the field of configuration of wireless multimedia computing devices.

Discussion of the State of the Art

It is commonplace to stream various multimedia content to one or more devices from a single computing device. For example, a "smart TV," possibly based on LINUX™ (or a variant of LINUX™ such as ANDROID™ or CHROME OS™) or based on FREEBSD™ may display high-definition video and stream various channels of audio to audio rendering devices (some integral to the Smart TV and possibly some separate from it). Or, a user of a mobile device such as but not limited to a tablet or smart phone may wish to watch a video on their device while having the audio streamed to and played back by a plurality of wireless speakers.

One task that routinely receives negative post installation review related to complex multipart consumer systems is difficulty of configuration. Failure to correctly configure the system may also lead to long term dissatisfaction with the system which should bring the purchaser a period of trouble-free and satisfied use. Some consumers are even known to have returned a system otherwise very well suited for their desired outcome due to mis-configuration. These systems may be complex and therefore may, indeed be difficult for the consumer to configure correctly. Failure of confusion early on may lead the purchaser to give up or to forge on with subsequent steps reliant on the ones they failed to complete. Configuration of home theaters and multi-unit wireless networks may to be on the harder end of the spectrum. A system combining both of these areas must have an extremely clear, and effective configuration plan. The more that may be automated for the customer, while still giving her control to customize the purchased system to her expectations should be a goal.

What is therefore needed, is a means for providing a reliable, easily understood and easily implemented, automated, configuration plan for the set-up and maintenance of home theater systems, particularly those that make use of wireless access points, wireless mobile devices, smart TVs, and wireless speakers.

SUMMARY OF THE INVENTION

Accordingly, the inventor has conceived and reduced to practice, in a preferred embodiment of the invention, a system and various methods for semi-automated configuration of a low-latency multimedia playback system. The following non-limiting summary of the invention is provided for clarity, and should be construed consistently with embodiments described in the detailed description below.

To address the problem of highly difficult configuration of multi-part electronic systems such as a dual wireless network multimedia playback system with cloud service connectivity and multiple wireless speakers, possibly from different manufacturers, the inventor has devised and placed into practice a semi-automated configuration protocol that makes use of a consumer's wirelessly connected smart phone, tablet or possibly laptop computer to download a small application that first initiates the configuration process and then acts as a program conduit for configuration screens sent from an embodiment of the invention which is a low-latency multimedia computing device. The process begins when the consumer plugs the low-latency multimedia computing device into the HDMI port (for example; other high definition media ports such as DISPLAYPORT™ may also be used) of their television and powers it. The consumer then starts the complementary app on their mobile device which identifies and confirms the validity of the multimedia computing device through the device's transmission of both its SSID on a preprogrammed wireless channel along with other identifying information. The consumer is then presented with and selects the desired multimedia computing device to which her mobile device then automatically connects or she is walked step by step through a specific manual connection process based upon the app's identification of her mobile device. Once the logical connection between the multimedia computing device is completed, the multimedia computing device established a virtual desktop screen on the consumer's mobile device and presents a complete set of preprogrammed configuration screens which present as much information about the consumer's components as may be determined. The entire process provides pointers tips and help screens, some automatically at points of known probable peril but most as requested by the consumer. All tasks needed to establish at least a basic working home theater system are included. Consumers are given the option to stop as needed, but warnings are given as needed and uncharacteristic stops may result in display of a query box asking for a description of the problem, help topics related to the query answer or the step of possible difficulty, or references on getting support for the issue all using cloud resources. Once the initial configuration is completed the customer may return to specific screens of the configuration process as changes to their physical system or expectation change. The goal of all of this is to attain a successful system set-up that fully meets customer expectation accounting for equipment choices in an illustrative, expressive and automated manner that satisfies and excites the customer about their new purchase.

According to a preferred embodiment of the invention, a system for semi-automated configuration of a low-latency multimedia playback system, comprising: a media computing device comprising a processor, a memory, a wireless network adapter, a virtual screen driver; and an operating system comprising programming instructions stored in the memory and operating on the processor and configured to: receive a plurality of user interaction events via a wireless network; direct the operation of a plurality of media computing devices communicating via the wireless network; transmit a plurality of set-up prompts over a wireless network, the prompts configured to present configuration information for display to a user, receive at least a user interaction event, and transmit at least the user interaction event to the media computing device; direct the configuration of the media computing device, the configuration being based at least in part on a received user interaction event; and wherein the configuration of the media computing device comprises at least a plurality of configured network connections, the network connections comprising at least a connect to a wireless access point and a connection to a media rendering device, is disclosed.

According to another preferred embodiment of the invention, a method for semi-automated configuration of a low-latency multimedia playback system, comprising the steps of: transmitting, using a media computing device comprising a processor, a memory, a wireless network adapter, a virtual screen driver; and an operating system comprising programming instructions stored in the memory and operating on the processor, a plurality of set-up prompts over a wireless network, the prompts configured to present configuration information for display to a user, receive at least a user interaction event, and transmit at least the user interaction event to the media computing device; receiving a plurality of user interaction events via a wireless network; and directing the configuration of the media computing device, the configuration being based at least in part on a received user interaction event, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
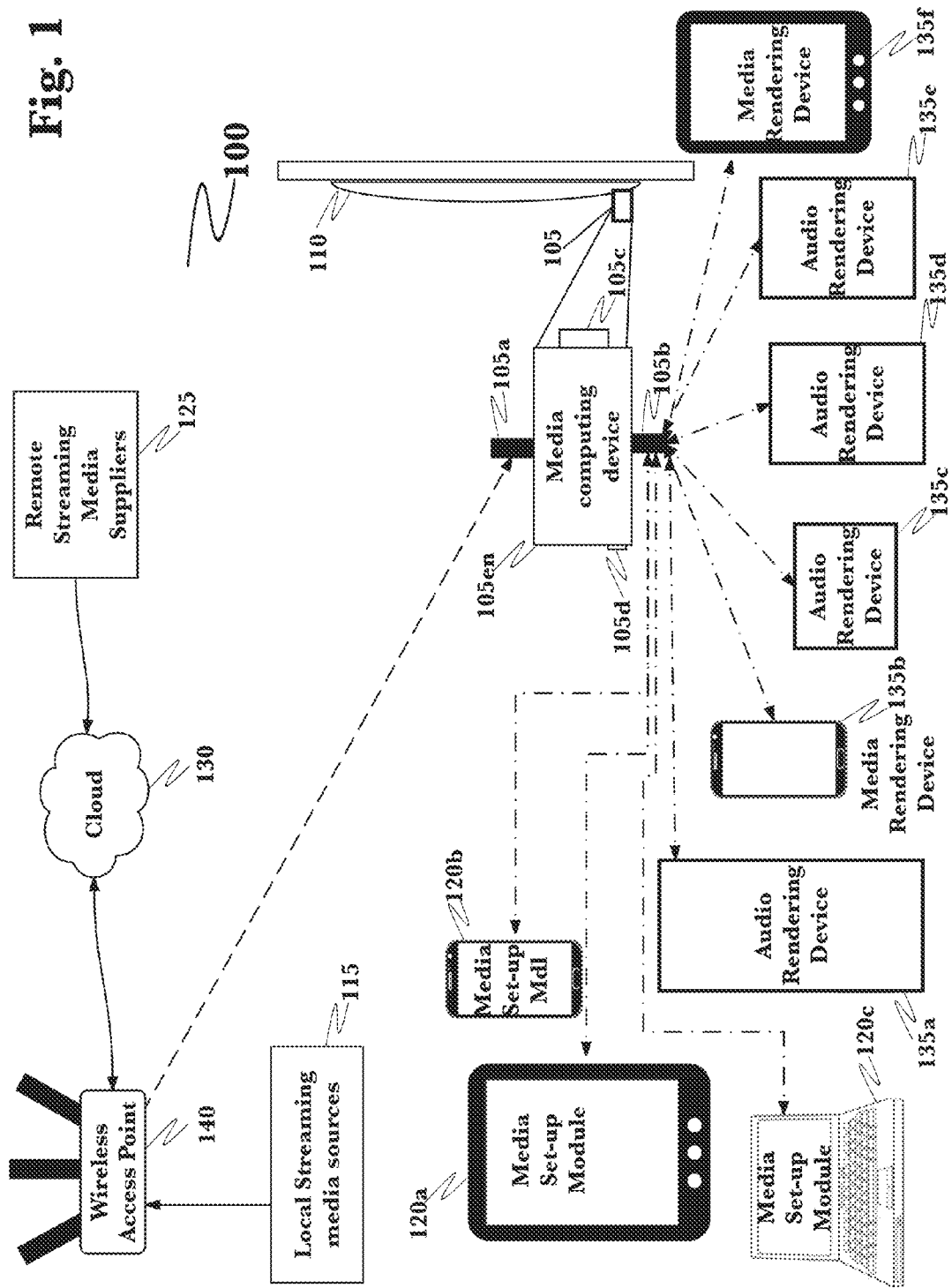
FIG. 1 is a block diagram illustrating an exemplary system architecture for configuration of multimedia playback systems using low-latency media computing device, according to a preferred embodiment of the invention.

The inventor has conceived, and reduced to practice, in a preferred embodiment of the invention, a system and methods for semi-automated configuration of a low-latency multimedia playback system.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for configuration of multimedia playback systems using low-latency media computing device, according to a preferred embodiment of the invention 100. The low-latency media computing device 105 may plug into a multimedia-in port such as but not limited to an HDMI™ port, or, in an alternate configuration, a DISPLAYPORT™ port of a media display device such as a television, an HD television, a UHD television or computer monitor, among other suitable display devices familiar to those skilled in the art 110, using the appropriate adapter (connected to the corresponding controller) for the supported port type 105c as depicted on the enlarged view of the low-latency media computing device 125en. The low-latency computing device may receive multimedia content from several sources which include but are not limited to cloud based 130 streaming multimedia content suppliers 125 of which NETFLIX™, HULU™ and AMAZON PRIME™ are a few examples from a larger plurality of sources. Multimedia content may also be stored locally as part of a collection downloaded from services such as APPLE ITUNES™, and AMAZON VIDEO™ to name two non-exclusive examples 115. This method may be chosen due to network bandwidth constraints in a user's area or other personal preference of a user. Multimedia content from both sources may be received by the media computing device 105 over an available local wireless network 140 to which the low-latency media computing device is connected 105a. Under some usage conditions and system embodiments, multimedia content may be received through a physical data bus connection such as but not limited to USB™, LIGHTNING™ or THUNDERBOLT™ 105d, among other data I/O standards known to those skilled in the art, for example in cases where the device in use is not part of the area wireless network, where an area wireless network is not available or where such a connection offers greater convenience.

Wireless communications between the low-latency media computing device and media rendering devices as well as system configuration and control devices are mediated by a second, low-latency, wireless network 105b hosted on the low-latency media device for the purpose of creating a means to distribute media content, which is highly sensitive to delivery delay and packet loss with regard to user awareness, to those rendering devices 135a, 135b, 135c, 135d, 135e, 135f. The low-latency wireless network may be a wireless LAN where the low-latency media computing device 105 acts as a software wireless access point or may use technologies such as but not limited to BLUETOOTH™, ZIGBEE™, and PAN and may easily be modified to use other wireless network technologies as they become prevalent. Some rendering devices, co-resident on a user's smartphone 135b or tablet 135f, may have both video and audio rendering capabilities and thus may display the same content as on the main screen 110 and at least one of the main screen's content's audio channels, under certain other conditions these media rendering devices may display entirely separate media content than that on the main screen and at least one channel of that entirely separate content's audio, but content that is still supplied through the low-latency media computing device or, as in the case of use of the embodiment in first person virtual reality games, media rendering devices may play individualized video and audio content to augment what is shown on the main screen among other individualized uses for a media rendering device known to those skilled in the art that the invention may present. A second type of rendering device may play audio content only 135a, 135c, 135d, 135e. These wireless audio rendering devices may be configured and physically positioned make up a sound rendering system of the low-latency media computing device such as but not limited to, stereo sound system, or 5.1 or 7.1 home theater surround sound system among other possible but less prevalent configurations.

The low-latency media computing device is configured by first plugging the device 105 into a television or monitor and applying power. In the embodiment, a user then uses a specifically downloaded app resident on her mobile device such as but not limited to a smart phone 120b, tablet 120a or laptop 120c which automatically searches wireless networks for and lists available low-latency media computing devices through. If more than one low-latency media computing device 105 are present, the app gives the user the option to select the desired device from a list. Once the user connects to the low-latency media computing device 105, she is presented with a virtual desktop generated by a virtual screen server and graphics subsystem on the low-latency media computing device and delivered over the low-latency wireless connection 105b. Configuration screens and user responses are delivered wirelessly 105b. The first configuration screen may be to connect the low-latency media computing device 105 to the user's general wireless network 140 to provide cloud 130 access. This network 105a, 140 is usually WiFi™ mediated but may be cellular WAN or some other network type known to those skilled in the art depending on embodiment and user preference. Other screens drive identification of media rendering devices 135a, 135b, 135c, 135d, 135e, 135f to be used in the current multimedia playback system. Some of the rendering devices may be low-latency computing device aware and provide playback information automatically, while other devices may require additional manual steps such as addition to the low-latency media system by SSID or network address or manual input of specifications on the configuration screen. Another configuration screen may drive identification of positioning of audio rendering devices within the system. Other screens transmitted wirelessly from the low-latency media computing device 105 may control such functions as playback, audio volume, audio balance, adjustment of audio signals at particular frequencies and video playback device assignment among other adjustments.

Under certain embodiments, low-latency computing device virtual screen mediated configuration and control may be performed over a physical I/O bus 105d such as USB™, THUNDERBOLT™, or LIGHTNING™, among other similar options. Such a need might arise if the available configuration device does not support wireless networking or when configuration and control of the device must be kept limited to a small number of operators.

Figure 2:
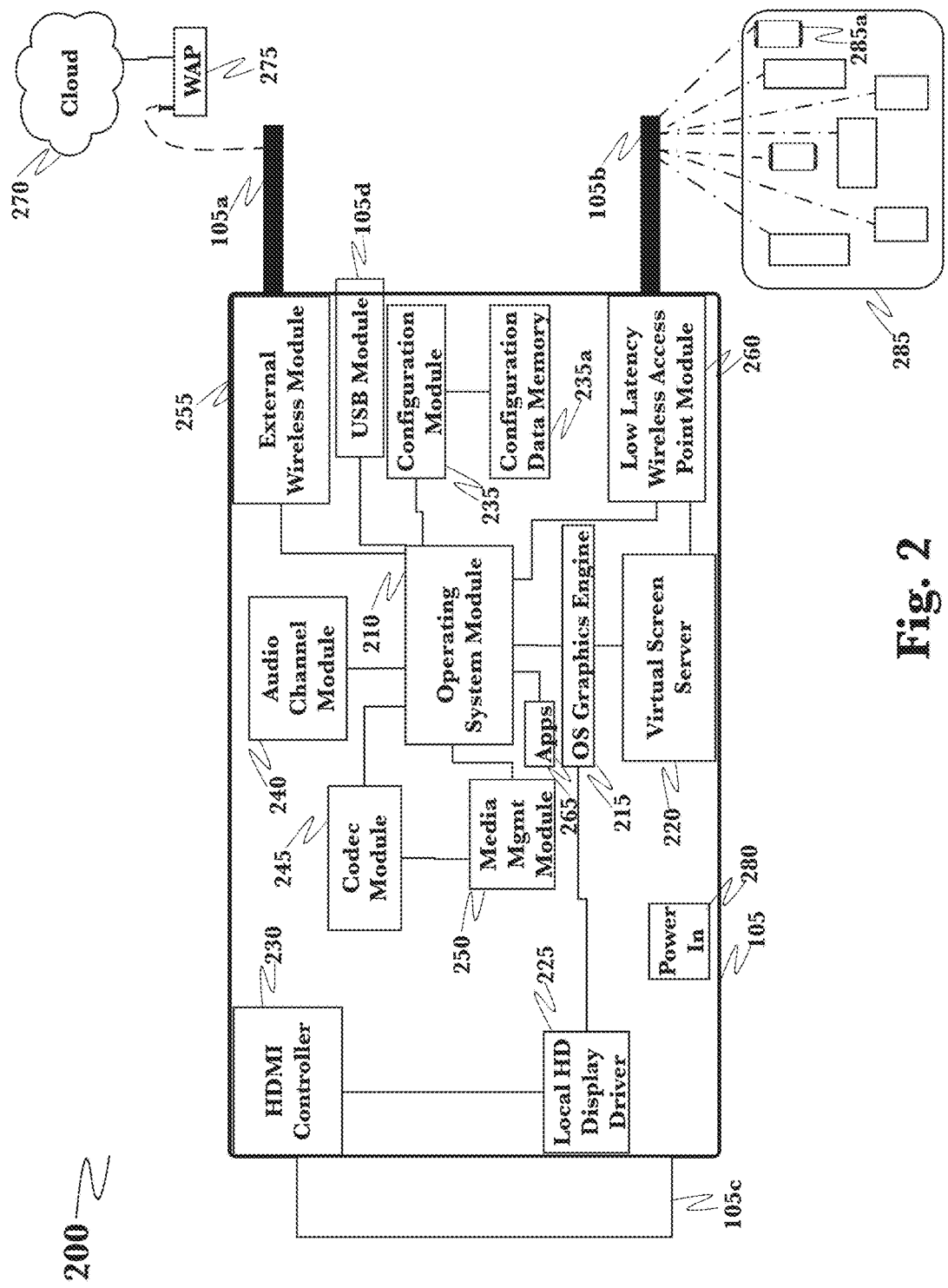
FIG. 2 is a block diagram illustrating an exemplary system architecture for a low-latency media computing device, according to a preferred embodiment of the invention.

FIG. 2 is a block diagram illustrating an exemplary system architecture for a low-latency media computing device 200, according to a preferred embodiment of the invention. The low-latency media computing device 105 is designed to connect to video media rendering devices such as computer monitors and televisions which may be standard, HD, UHD or other definition class known to those skilled in the field through an HDMI™ port or some similar multimedia-in port such as but not limited to DisplayPort™ among others. Different embodiments of the invention may collectively connect to any modern media port, current or upcoming, with substitution of one connector 105c and controller circuitry 230 pair for another across embodiments. Of course, the invention may have different concurrent embodiment versions available at a given time. When a low-latency media computer device is connected to a video rendering device and powered 280 for the first time, it will enter a pre-programmed configuration mode 235 and broadcast its SSID, for example "MCD47" over its wireless network access point 260, 105b. At this point, a user who has downloaded a specific low-latency media computing device app onto her smart phone, tablet or laptop, to name just a few possible mobile devices 285a may start that app, and, if there are more than one low-latency media devices available, many of which may already be configured but broadcasting their SSID to allow users to connect for media playback control purposes, to her, pick the desired device for initial configuration and connect to it. While the low-latency media device does not present a local user interface, it uses a virtual screen server 220, available with most modern operating systems 210 such as but not limited to FREEBSD™, LINUX™ and its derivatives such as GOOGLE ANDROID™ and GOOGLE CHROME OS™, APPLE IOS™, and WINDOWS™ to present configuration screens programmed in the configuration module 235 and generated by the operating system's OS graphics engine 215 over the low-latency network 260 to the user's mobile device 285a. Through a progression of configuration screens sent 235, 210, 215, 220, 260, 105b, 285a and responses received from the user 285a, 105b, 260, 210, 235, operations such as connection to the user's outward facing wireless network access point 275; identification and enrollment of audio rendering devices which may be wireless speakers of multiple sizes and configurations, mobile devices such as smart phones or tablets, and other wireless devices known suitable to those skilled in the art 285; identification of placement and role of those audio rendering devices within the system 285; and low-latency media computing device configuration process mediated testing of image rendering and audio rendering functionality prior to use. All entered configuration parameters are persistently stored in the configuration data memory 235a.

Under at least one embodiment the low-latency media computing device may be equipped with an I/O bus such as USB™ or THUNDERBOLT™ 105d that allows a physical connection to be made. This physical connection may be used for configuration in some situations as well as for input of multimedia content under certain conditions.

Once configuration has completed, including entry of any multimedia service urls and subscription credentials, one mode of playback of multimedia entails the receipt of streaming multimedia from one of those cloud sources 270 through the user's internet connected wireless access point 275 and into the low-latency media computing device through one of its two wireless transceivers 255. The incoming multimedia is processed by the media management module 250 and the codec module 245 which may first decode the incoming multimedia stream from the compression algorithm used by the multimedia service and then may re-encode the video, audio or both streams individually for re-transmission over the low-latency network 260 using one or more compression algorithms employed by the display or audio rendering devices 285. Certain operating systems may only support two audio channels, allowing reproduction of only stereo sound. The low-latency media computing device 105 has programming that makes up the audio channel module 240 as part of the operating system module 210 as described in co-pending and jointly-owned U.S. patent application Ser. No. 15/178,544, titled "MEDIA COMPUTING DEVICE WITH MULTIPLE VIRTUAL SCREENS AND PERSONAL AREA NETWORK CAPABILITY", which was filed on Jun. 9, 2016 (the entire specification of which is incorporated herein by reference) that allows for accurate reproduction of sound channels above the standard two such as but not limited to 5.1 and 7.1 home theater sound by dynamically adding audio channels as needed. Finally, media video is delivered from the media device employing the OS graphics engine 215, and local HD display driver 225 to the main display screen through the HDMI connection 105c. Control of such features as playback, audio volume, and audio enhancement as well as others are controlled using low-latency media computing device generated screens generated by the OS graphics engine 215 and the virtual screen server 220 of the operating system module 210. One or more screens of the configuration process may be accessed at any time by selection of the labelled button. The system also allows games to be downloaded and played and has memory set aside 265 to accommodate this functionality.

Figure 3:
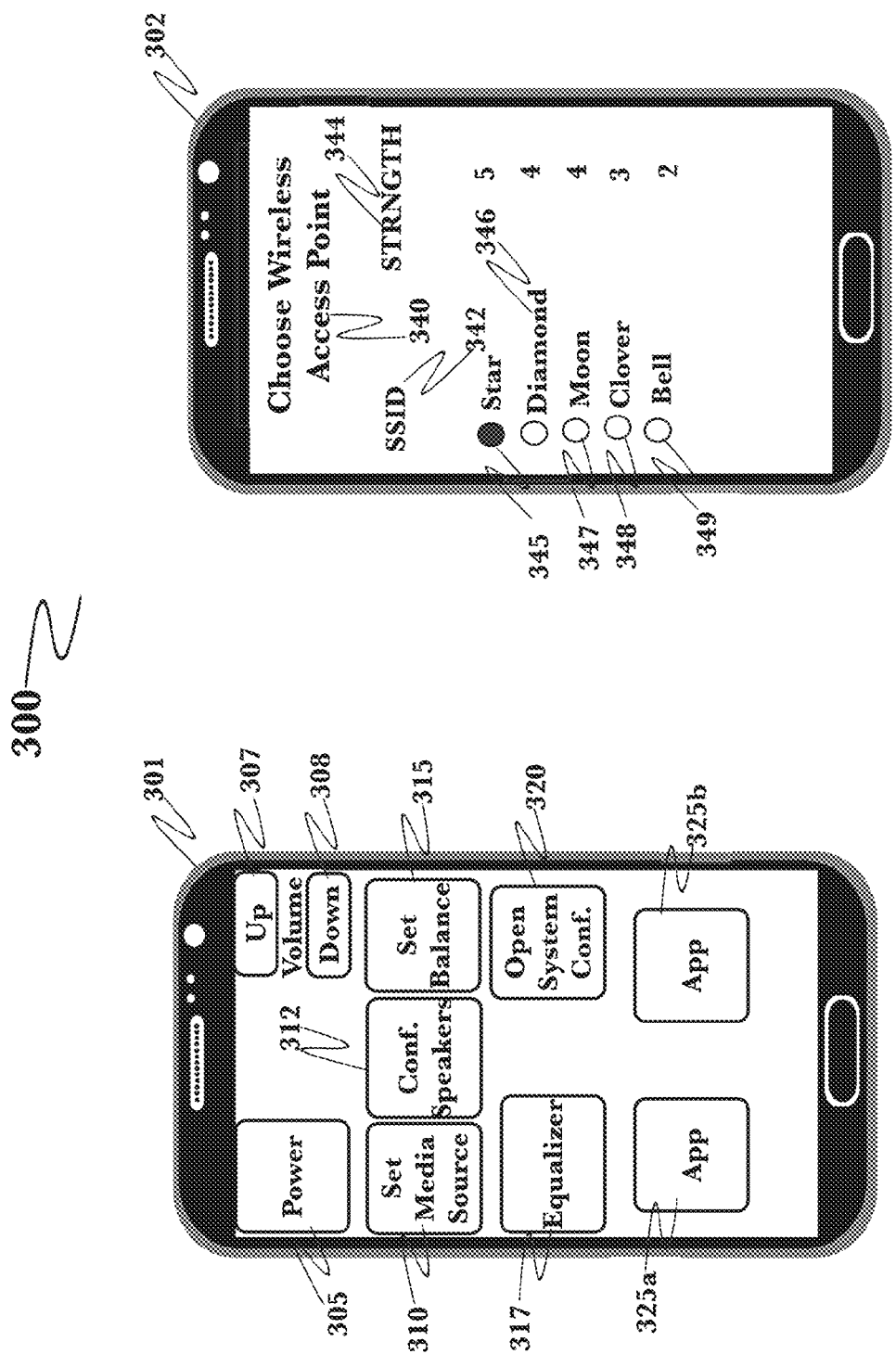
FIG. 3 depicts an exemplary home screen and wireless access point configuration screen transmitted from the virtual screen server of the low-latency media computing device according to a preferred embodiment of the invention.

FIG. 3 depicts an exemplary home screen and wireless access point configuration screen transmitted from the virtual screen server of the low-latency media computing device 300 according to a preferred embodiment of the invention. The exemplary screen of one embodiment illustrates a typical home screen for the low-latency media device 301 shows typical choices available during normal operation of the system. One sees a power button in the upper left 305 which may activate the low-latency media computing device and rendering devices that support low power modes. Volume control may also be present 307, 308. Selection of the "Set Media Source" button 310 may bring up a list of available media sources both local (FIG. 1, 115) and cloud based (FIG. 1, 125) one of which the user may then choose as the current active source. The selection 310 may be followed by display of a respective multimedia service's media content selection screens presented through the low-latency media computing device's virtual screen server (FIG. 2, 220), to select content. Audio rendering devices may need configuring more than other components and have a way to select that configuration page directly 312, otherwise other configuration related screens may be opened 320 as needed. Other than volume 307, 308 important audio adjustments including balance 315 and equalizer 317, both of which may open additional screens on user's mobile device to perform adjustments. Two or more general or assignable buttons may also be part of a low-latency media computing device generated home screen 325a, 325b.

Another embodiment 302 illustrates an exemplary wireless access point selection configuration screen 340 as presented through virtual screen server (FIG. 2, 220) of a low-latency media computing device (FIG. 2, 105). This screen may display the SSID 342 of all wireless access points detected by the low-latency media computing device in list form 345, 346, 347, 348, 349, although other identifying information such as but not limited to: ip address or cellular data network access number may be displayed by other embodiments. Embodiments may show other information considered relevant to best access point selection such as relative signal strength 344 or similar suitable information known to those skilled in the art. The user would then choose the appropriate home wireless access point 345 which may then be used by the system to retrieve all multimedia content and applications requested by user.

Figure 4:
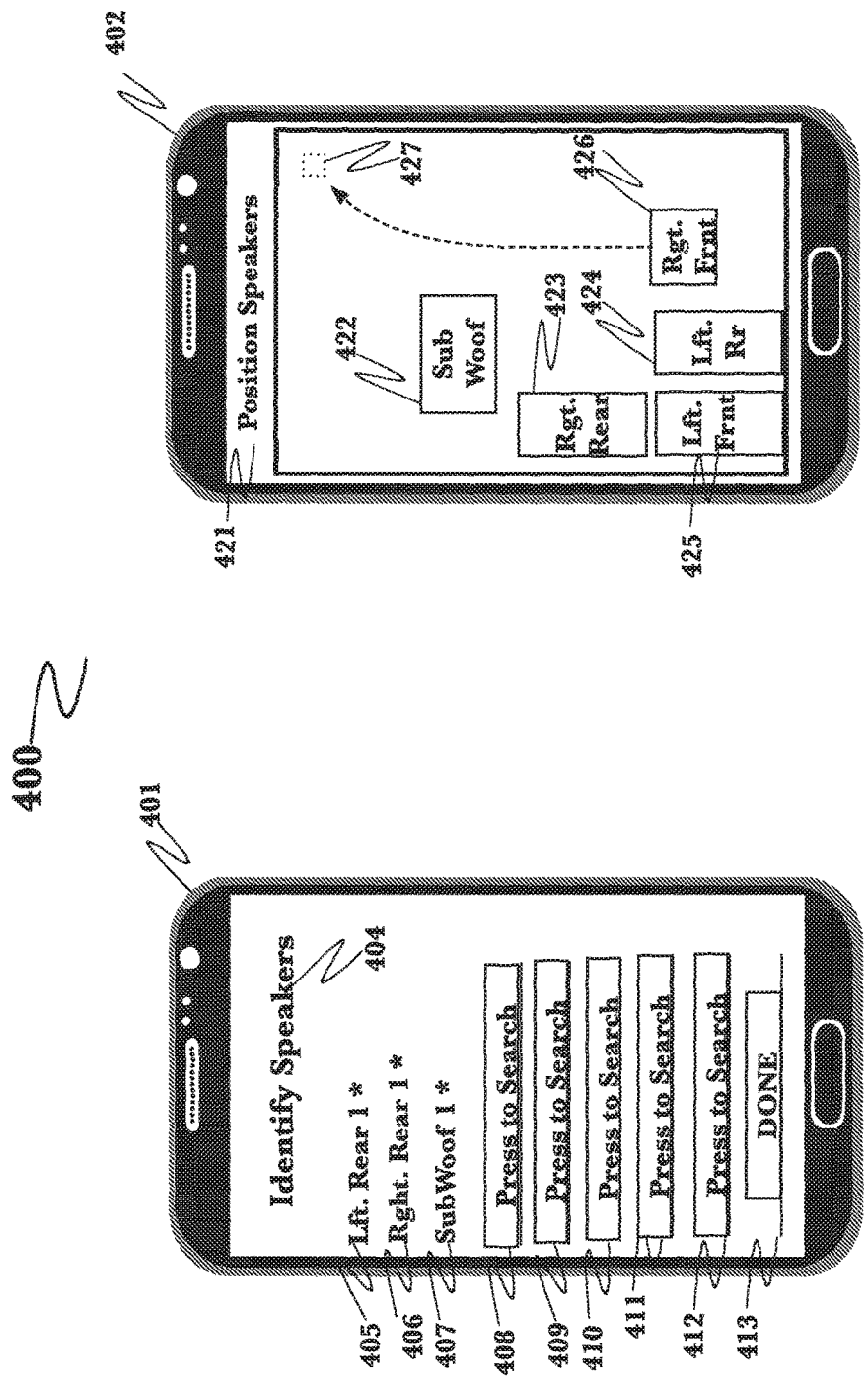
FIG. 4 depicts an exemplary wireless audio rendering device configuration screen and wireless audio rendering device placement identification configuration screen transmitted from the virtual screen server of the low-latency media computing device according to a preferred embodiment of the invention.

FIG. 4 depicts an exemplary wireless audio rendering device configuration screen and wireless audio rendering device placement identification configuration screen transmitted from the virtual screen server of the low-latency media computing device 400 according to a preferred embodiment of the invention. Configuration of audio rendering devices is also mediated by screens programmed in the low-latency media computing device (FIG. 2, 105), configuration module (FIG. 2, 235) and presented through the virtual screen server (FIG. 2, 220). Two exemplary illustrations of a larger plurality of possible audio rendering device specific configurations screens are depicted 401, 402. The first audio rendering device configuration screen 401, assists the user to identify and enroll the desired audio rendering devices 404, which may be traditional, but self-powered, self-amplified and wireless speakers 500 or in some cases, they may be the audio output of mobile computing devices such as but not limited to smart phones, tablets and laptops. A subset of these audio rendering devices are envisioned to be low-latency computing device (FIG. 1, 105) aware. These audio rendering devices may show on a configuration screen by a user defined or factory assigned (for example a manufacturer:model:serial number, although many other possibilities found apropos to those skilled in the art may also be supported) name 405, 406, 407 possibly with an indication that all specifications needed for control during playback have been received (for example "*"). There may also be audio rendering devices that are not recognized by the low-latency media computing device for one of a large plurality of reasons. The user configuring the multimedia playback system may need to search for those powered-on but not listed speakers 408, 409, 410, 411, 412. Selecting one of the search button may bring up additional screens (not shown) that allow the user to designate a desired speaker by identifiers such as but not limited to: SSID, IP address, or MAC address or the like as well as other suitable wireless identifiers known to those skilled in the art. Such identification of an audio rendering device may initiate display of additional screens if the device does not then auto-transmit specification data needed for playback. Once all desired audio rendering devices are identified and enrolled with all needed specification data, the user may press a button 413 to end the process.

A second common task 402 is identification of the physical positions of the enrolled speakers and specification of their intended roles in the audio reproduction arrangement envisioned by the user. For this purpose, the configuration module of the low-latency media computing device may display a simple representation of a rectangular room the shape of which a user may modify, if needed and place representative shapes of the audio rendering devices based upon their specification revealed types 422, 423, 424, 425 (for example, tablet, sub-woofer, main speaker, satellite speaker, other). The configuration interface may also allow the user to designate each audio rendering device's role in sound reproduction (right rear, left rear, subwoofer, etc.) and to then move the device into the relative position in the room that it occupies 427.

Other, unmentioned or unillustrated, configuration screens and tasks may also be needed to complete low-latency media computing device configuration. The screens depicted here 400 and in 300 are a small exemplary sample meant as illustrative examples of the larger set which may include help screens, contextual help windows, FAQ screens, and pop-up tip windows as well as other component set-up related panels. Also, necessary features of the screens illustrated may have been omitted in the included drawings 300, 400 for easy of presenting the information in each panel and does not represent a lack of feature or capability on the part of the invention which has the entire complement of configuration programming to allow a user to successfully complete configuration of a multimedia playback system based upon consumer level knowledge of the field on the part the user.

Figure 5:
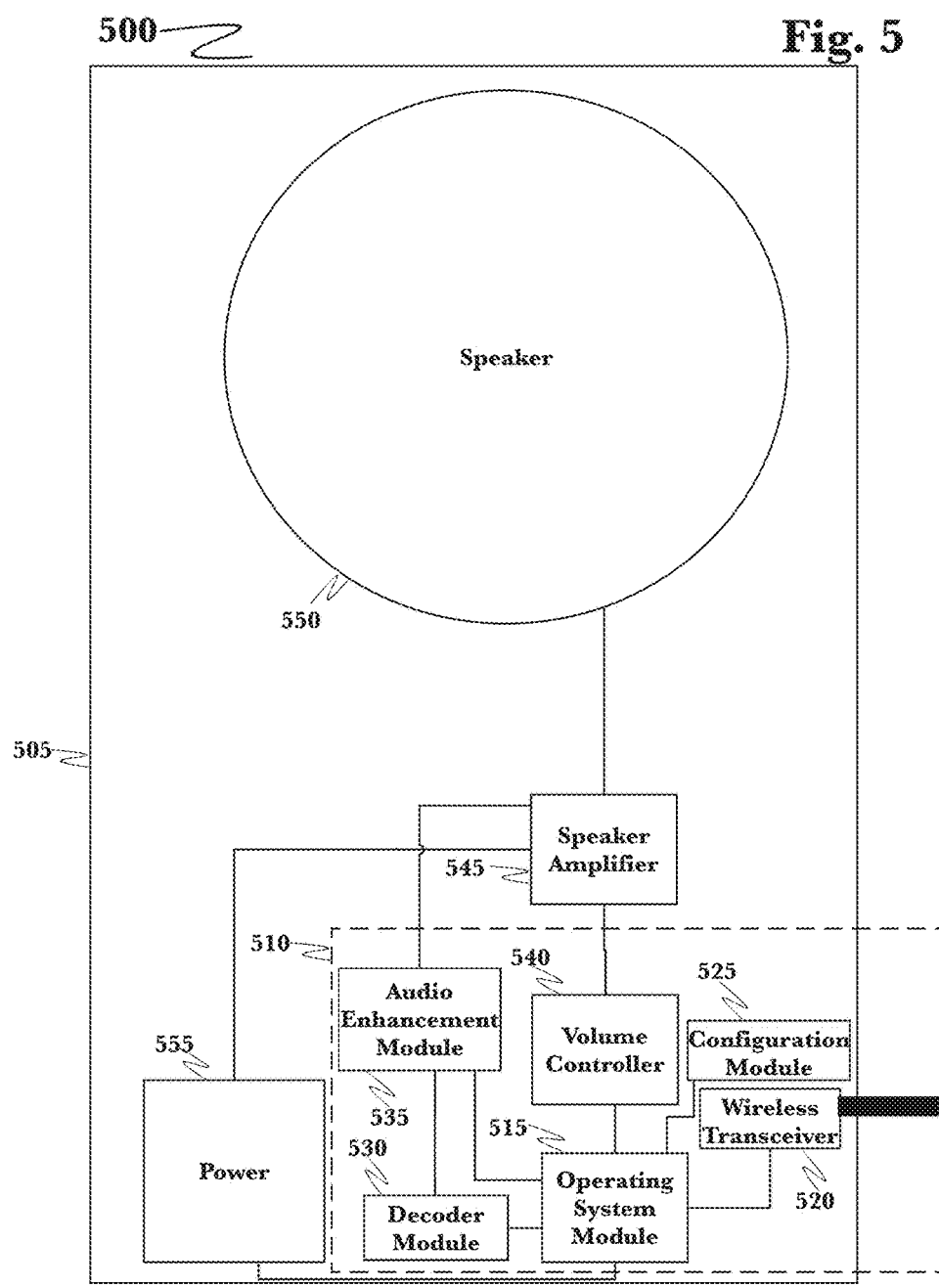
FIG. 5 is a system block diagram illustrating an exemplary wireless audio rendering device according to an embodiment of the invention.

FIG. 5 is a system block diagram illustrating an exemplary wireless audio rendering device 500 according to an embodiment of the invention. The system is designed to use a wide variety of wide variety of self-powered, self-amplified wireless audio rendering devices. Shown is a typical speaker 505 of the type expected compatible with the low-latency media computing device although all compatible speaker may not have all subcomponents shown and others may have additional subcomponents and capabilities. Such speakers, being stand alone may be expected to have a power supply 555, a wireless transceiver 520, a signal decoder 530 and a signal amplifier 545 to drive them as they are expected to be standalone units relying only on receipt of external audio media content for their function. As described, speakers would be quite limited as volume of playback, and audio channel equalization would not be possible. While the low-latency media computing device may be designed and programmed to partially compensate for such short comings, smart speakers which may possess an operating system module possibly based on LINUX™ or a lightweight variant thereof, FREEBSD™, ANDROID™, APPLE iOS™, WINDOWS™ or some other os known to those skilled in the art that includes modules that allow for not only decoding of the wireless signal 530 but control of the speaker's playback volume and adjustment of the speakers audio playback profile 510 during amplification 545 and physical reproduction 550 would be of great advancement to the sound quality of the system. A subset of audio rendering devices may be aware of the low-latency media computing device (FIG. 1, 105) and have the ability to both auto-identify themselves and send specification information to the device during the speaker set-up portion of low-latency media computing device configuration (FIG. 3, 301). The ability to save the current configuration for subsequent playback sessions 525 or to offer more control over playback characteristics 525 which may be transmitted and then presented during speaker configuration using the low-latency media computing device 200 would only serve to improve overall multimedia experience.

Description of Method Embodiments

Figure 6:
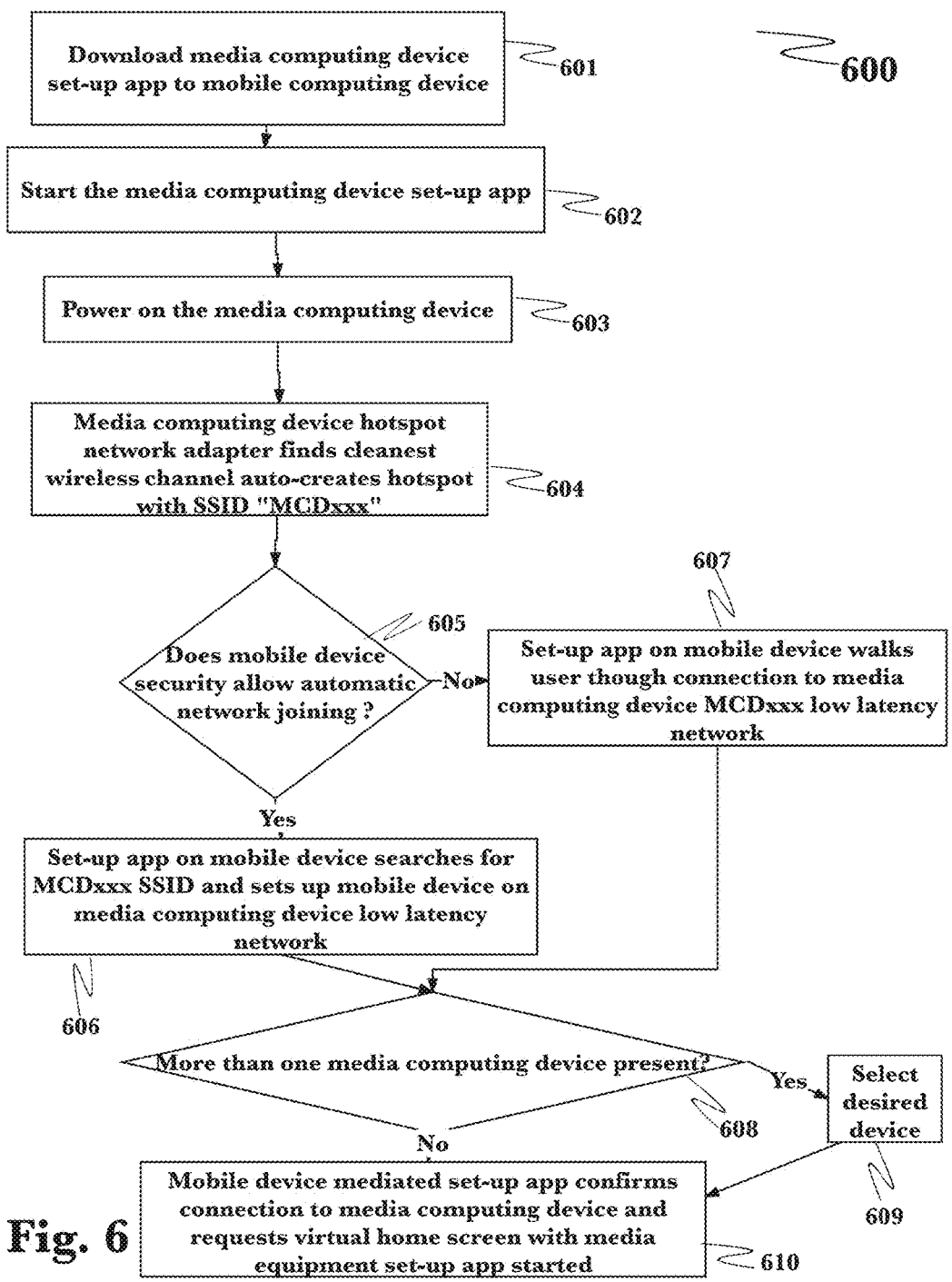
FIG. 6 is a flow diagram illustrating an exemplary method for initial configuration application start-up and low-latency media computing device to user mobile device pairing.

FIG. 6 is a flow diagram illustrating an exemplary method for initial configuration application start-up and low-latency media computing device to user mobile device pairing 600. Upon initial power-on of the low latency media computing device (FIG. 2, 105) configuration and eventual use of the media computing device (FIG. 2, 105) depends on pairing to a user's mobile device such as a smart phone tablet or laptop, although other computing devices may be used. The initial pairing is facilitated by a specific application downloaded by the user in preparation for use with the media computing device 601. At the onset of configuration session, the user starts the media computing device set-up app 602 and then plugs the low-latency media computing app into the media display and powers on the device 603. The media computing device surveys the local wireless environment for traffic and interference, selects the cleanest channel, auto-creates its own wireless access hotspot and begins broadcasting its unique SSID 604 which the app on the user's mobile device receives, sends return traffic to confirm the home device is a low-latency media computing device and, upon confirmation may auto-connect the user's mobile device to the media computing device's low latency (FIG. 2, 105b) 606. If user mobile device security measures or user selected preferences on that mobile device preclude automatic joining of a previously un-seen network 605, the media computing device set-up app on the user's mobile device will determine the device type and attempt to assist the user to connect to the media computing device hotspot 607. In the event that the initial media computing device set-up app on the user's mobile device detects two or more low-latency media computing devices within wireless range 608, the user may be presented with a selection screen listing all media computing devices and manually chooses the correct target 609. Once fully connected to the desired media computing device, the initial set-up app requests that further configuration screens be sent from the media computing device to mediate further media computing device and playback system component 100 configuration 610.

Figure 7:
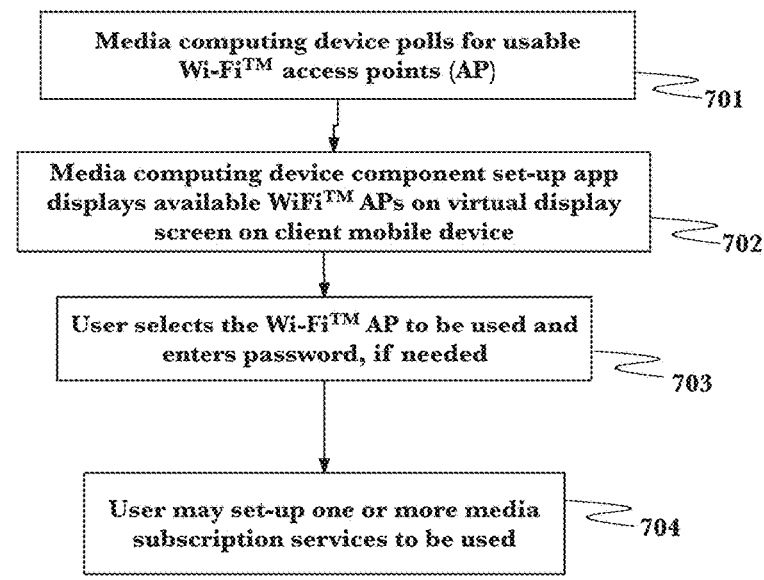
FIG. 7 is a flow diagram illustrating an exemplary method for identification and connection configuration of user's externally facing wireless access point using configuration screens transmitted by the low-latency media computing device.

FIG. 7 is a flow diagram illustrating an exemplary method for identification and connection configuration of user's externally facing wireless access point using configuration screens transmitted by the low-latency media computing device 700. Much of the multimedia content played through the low-latency media computing device (FIG. 1, 105) may come from sources in the cloud. Connection of the media computing device (FIG. 1, 105) to a user's internet connected wireless access point is mediated by the media computing device's configuration module programming (FIG. 2, 235). The media computing device polls for available wireless access points (WAP) 701 and presents those available WAPs to the user as part of a configuration screen on their mobile device 702. The user then selects the desired WAP to allow cloud access to the media computing device 703 and may be given an opportunity to set-up access to any cloud based multimedia services such as but not limited to NETFLIX™, HULU™, AMAZON PRIME™ or others to which she subscribes 704.

Figure 8:
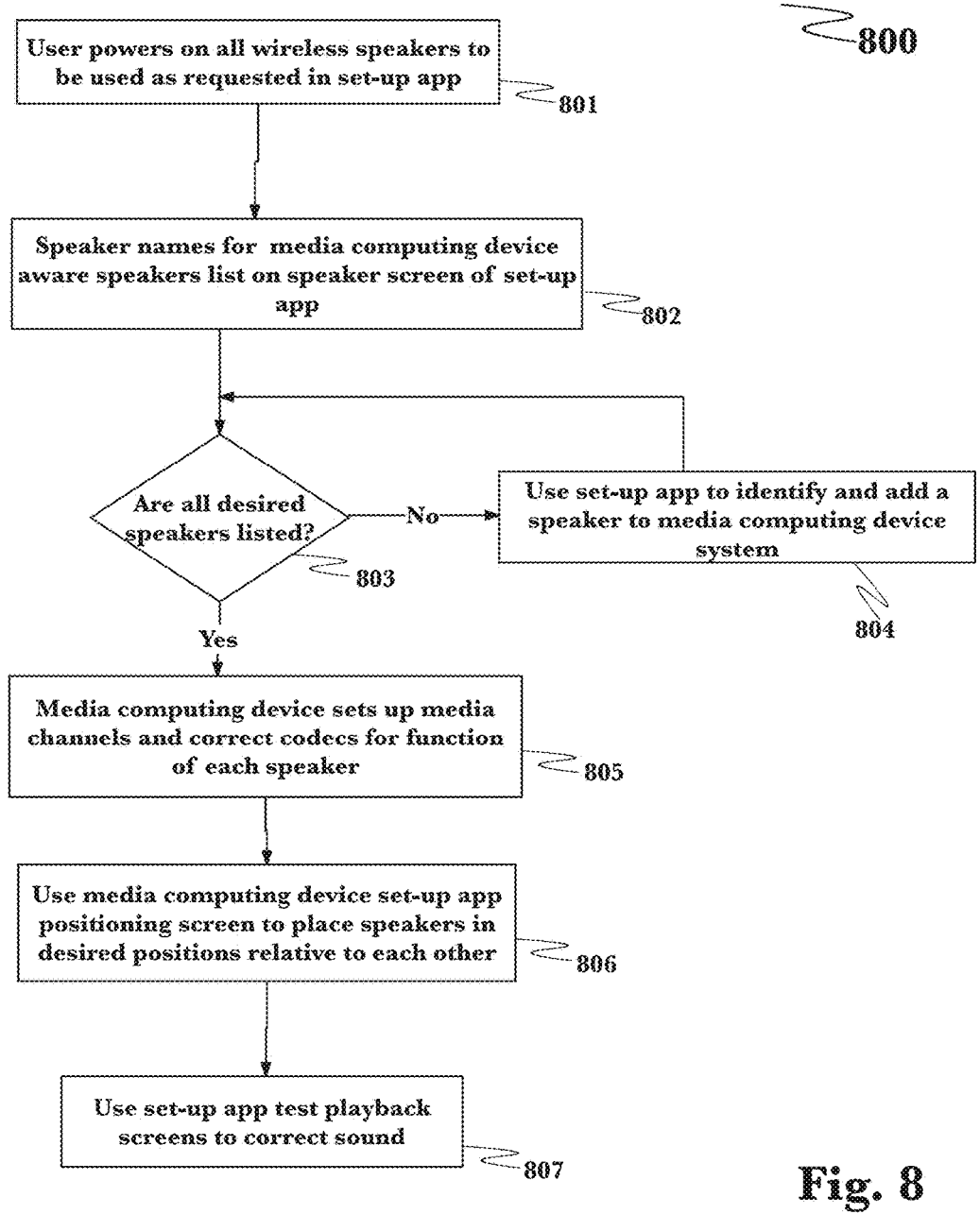
FIG. 8 is a flow diagram illustrating an exemplary method for wireless speaker identification, positioning and set-up using configuration screens transmitted by the low-latency media computing device.

FIG. 8 is a flow diagram illustrating an exemplary method for wireless speaker identification, positioning and set-up using configuration screens transmitted by the low-latency media computing device 800. Identification and enrollment of audio rendering devices into the low-latency media computing device playback system begins with the user powering on all speakers to be used in the desired configuration 801. The speakers will go through the power-on sequences and then announce their availability on the wireless network on which they operate which may be WiFi™, BLUETOOTH™, PAN or and other suitable wireless technology known to those skilled in the art. Embodiments may be available that operate using any of these differing technologies and a plurality of them may operate using more than one either individually or concurrently as compatible for each technology current or future. A subset of speakers may be low-latency media computing system aware and auto-transmit their SSID or other identifying designation and specifications to the media computing device. These speakers will be listed by name and possibly showing some other descriptors on the user's mobile device speaker configuration screen these speakers may be selected and enrolled directly, if desired 802. The user may have to manually search the wireless network for and manually enter specifications for these speakers that are not listed 803 by using different parts of the speaker configuration screen and possibly additional configuration screens to enter needed specification information. 804. If there are more than 2 channels to be reproduced by the system using certain operating systems such as but not limited to LINUX™ and its derivatives (ANDROID™, CHROME OS™) which have kernel based sound drivers that support only two channels, the audio channel module (FIG. 2, 245) may need to create additional channels to carry additional audio channel information for accurate playback of sound channels in excess of 2 805. Different audio rendering devices may also support different compression encodings for transmission of audio content from the media computing device 805, these differences must be accommodated by the codec module (FIG. 2, 245) 805.

Once all speakers are identified and enrolled with their specifications know, their roles in sound reproduction must be specified. For example for a home theater 5.1 system, the role of each speaker: Left Rear:Right Rear:Left Front:Right Front:Subwoofer, must be configured in the media computing device for correct logical channel assignment. The user may accomplish this using a screen that is part of the configuration process shown on her mobile device screen which may involve moving icons for each speaker into a standardized position in a virtualized room (FIG. 4, 402) presented on a configuration screen 806 although many other methods familiar to those skilled in the art may be used. To finish this audio rendering device specific segment of low-latency media computing device configuration, the user may be presented with or elect to access a configuration panel to play audio rendering device test tones and music to confirm such things as correct speaker designation and enrollment (all speakers play something) as well as audio balance among the speakers and desired overall tonal qualities, among many other possible parameters 807.

Other configuration tasks may come to mind that are not described here. Some have been excluded for expediency, others as they are for more specialized features inherent in the low-latency media computing device such as multiple video screen presentation and individualized virtual game set up, both of which have multiple decisions to be considered which would require several exemplary screen illustrations and make method flowcharts hard to both create and to follow. Even for examples given, secondary and greater level configuration screens may have been omitted. The intent was to give clear, concise examples of how configuration would work, tying system structure to method function where possible. Other configuration tasks, which exist and for which the media computing device is designed to present and process will work similarly logically and are expected to employ the same system structures.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 9:
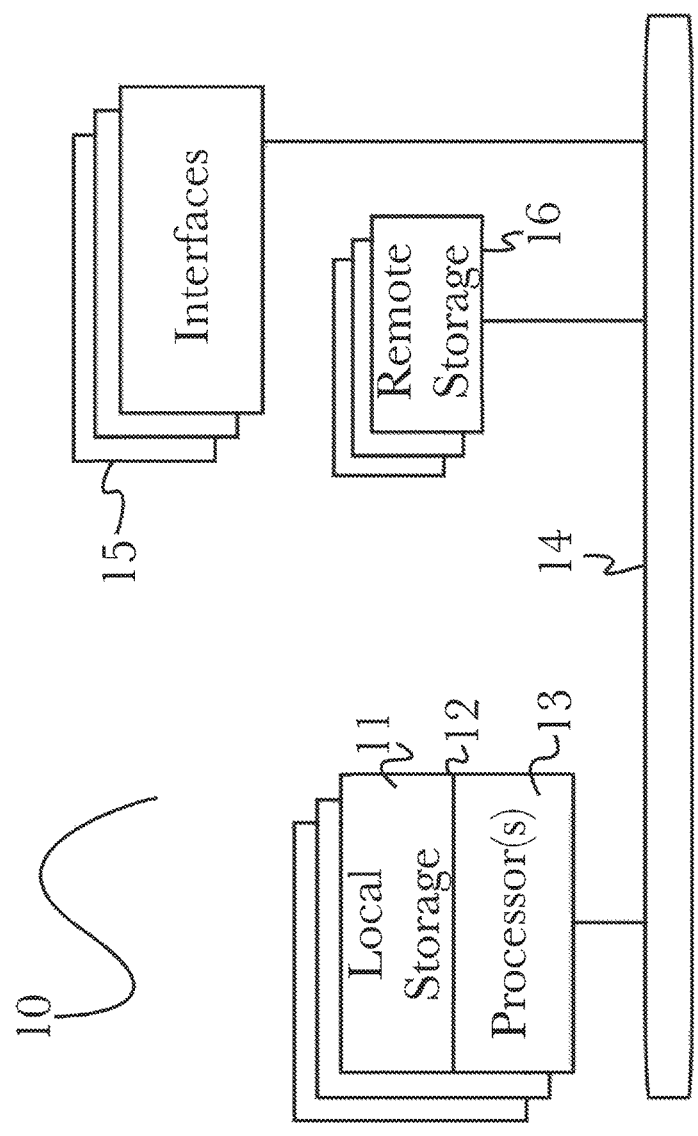
FIG. 9 is a block diagram illustrating an exemplary hardware architecture of a computing device used in various embodiments of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
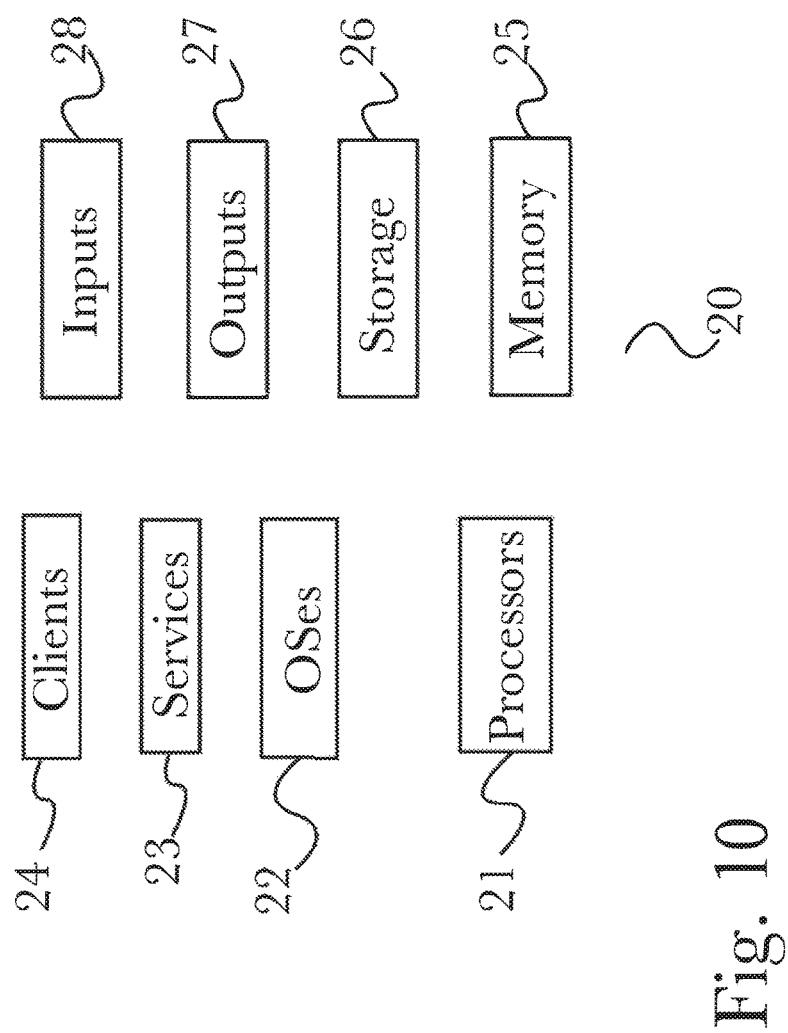
FIG. 10 is a block diagram illustrating an exemplary logical architecture for a client device, according to various embodiments of the invention.

In some embodiments, systems according to the present invention may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, FREEBSD™ or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
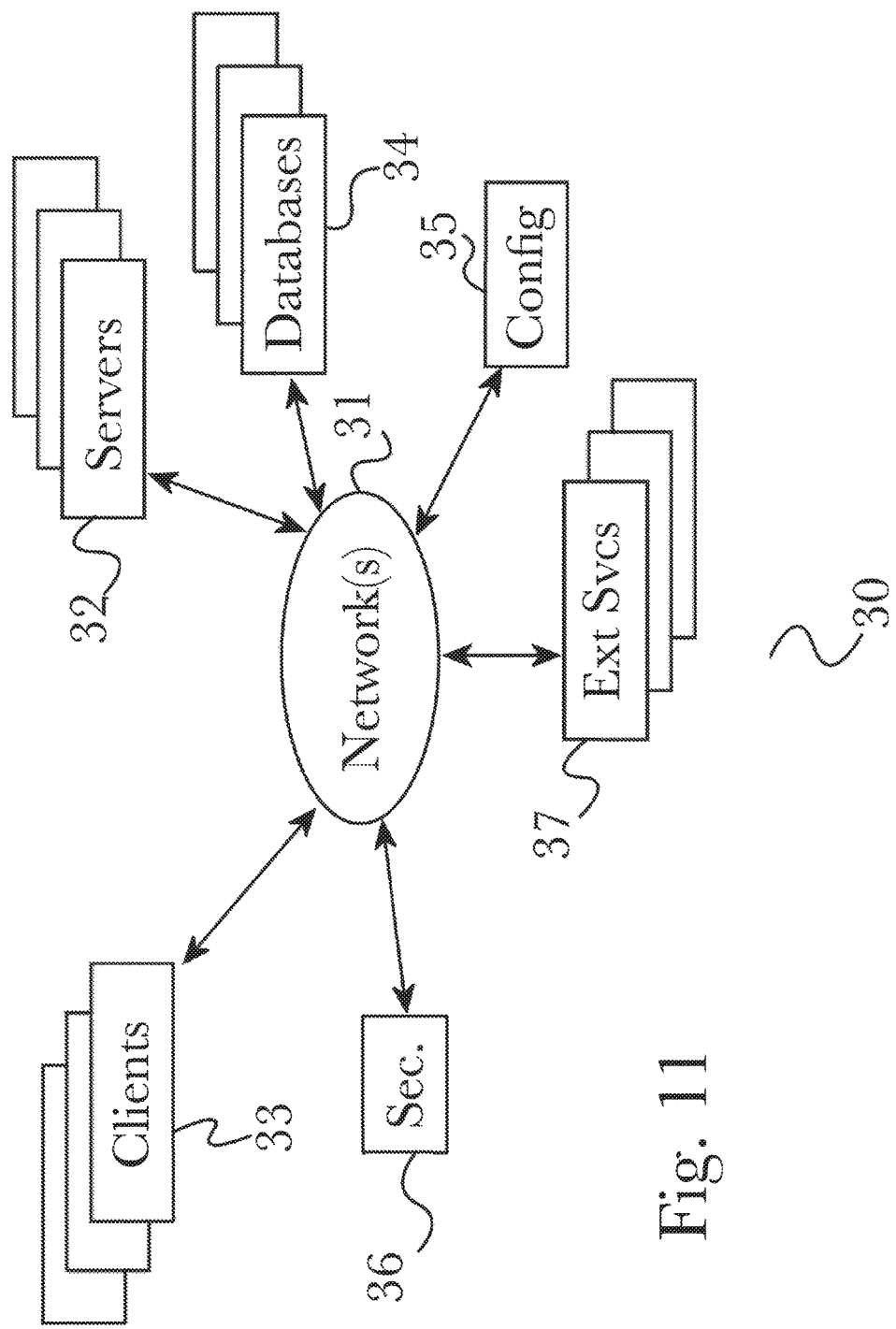
FIG. 11 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 11, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 12:
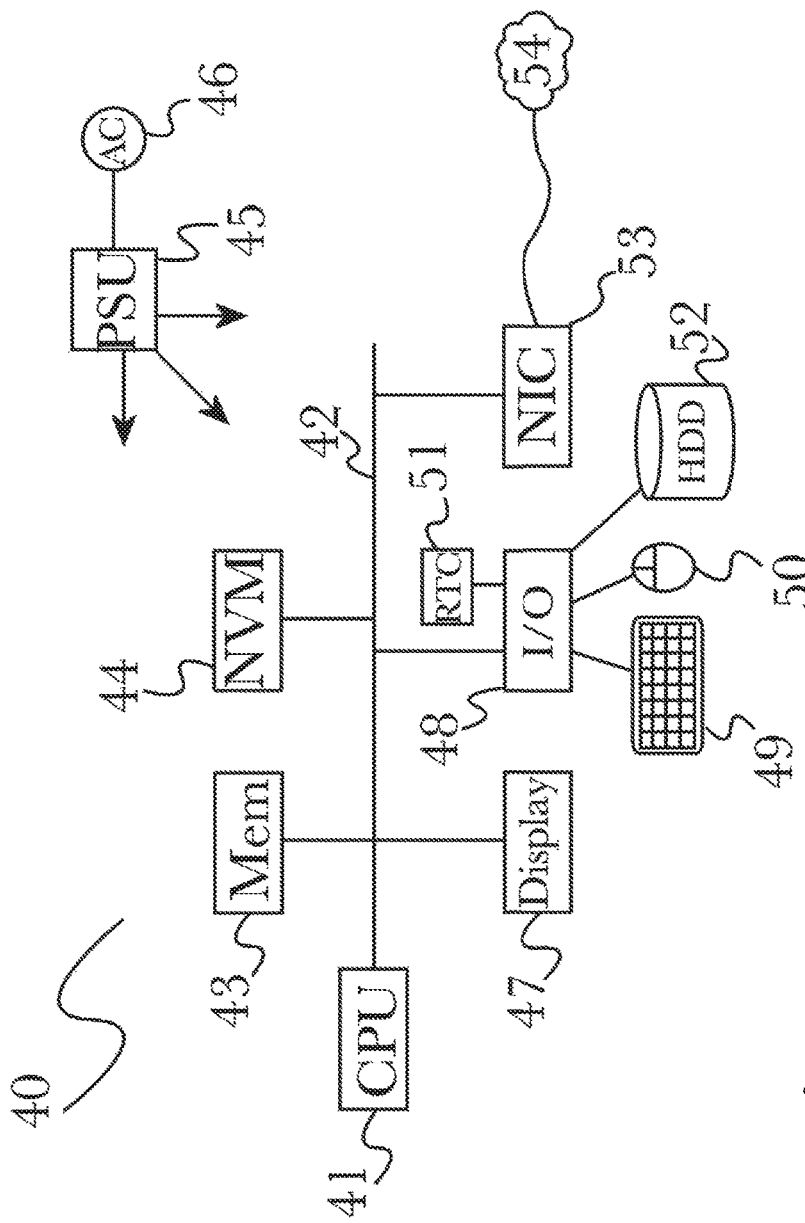
FIG. 12 is another block diagram illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for semi-automated configuration of a low-latency multimedia playback system, comprising:
a media computing device comprising a processor, a memory, a wireless network adapter, a virtual screen driver and an operating system comprising programming instructions stored in the memory and operating on the processor and configured to:
receive a plurality of user interaction events from two or more mobile devices via a wireless network;

send screen graphics using the virtual screen driver to the two or more mobile devices, providing thereby a complete, independent logical operating system interface to each mobile device, wherein the screen graphics comprise at least an interface for an application operating on the processor of the media computing device such that each of the two or more mobile devices interacts with the application simultaneously within the independent operating system interface;

transmit a plurality of set-up prompts over the wireless network to at least one of the two or more mobile devices, the prompts comprising configuration information requests pertaining to a plurality of media rendering devices and the two or more mobile devices; and direct the configuration of the media computing device, the configuration being based at least in part on a received user interaction event comprising a response to a set-up prompt;

wherein the configuration of the media computing device comprises configuring at least a plurality of network connections, the network connections comprising at least a wireless connection to a plurality of media rendering devices and wireless connections to two or more mobile devices.

2. The system of claim 1, wherein the configuration of the media computing device further comprises identification of physical placement of at least a media rendering device.

3. The system of claim 1, wherein the configuration of the media computing device further comprises configuring a plurality of audio playback characteristics selected by a user via one of the plurality of set-up prompts, wherein the audio playback characteristics are used to direct the operation of at least a media rendering device.

4. A method for semi-automated configuration of a low-latency multimedia playback system, comprising the steps of:

transmitting to a mobile device, using a media computing device comprising a processor, a memory, a wireless network adapter, a virtual screen driver; and an operating system comprising programming instructions stored in the memory and operating on the processor, a plurality of set-up prompts over a wireless network, the prompts configured to present configuration information for display to a user, receive at least a user interaction event, and transmit at least the user interaction event to the media computing device;

sending screen graphics using the virtual screen driver to two or more mobile devices, providing thereby a complete, independent logical operating system interface to each mobile device, wherein the screen graphics comprise at least an interface for an application operating on the processor of the media computing device such that each of the two or more mobile devices interacts with the application simultaneously within the independent operating system interface;

receiving a plurality of user interaction events via a wireless network; and directing the configuration of the media computing device, the configuration being based at least in part on a received user interaction event.

5. The method of claim 4, wherein the configuration of the media computing device further comprises identification of physical placement of at least a media rendering device.

6. The method of claim 4, wherein the configuration of the media computing device further comprises configuring a plurality of audio playback characteristics selected by a user via one of the plurality of set-up prompts, wherein the audio playback characteristics are used to direct the operation of at least a media rendering device.

* * * * *